(No Model.)
L. WALDEN.
Graduated Belt Stretcher.
No. 241,099.  Patented May 3, 1881.
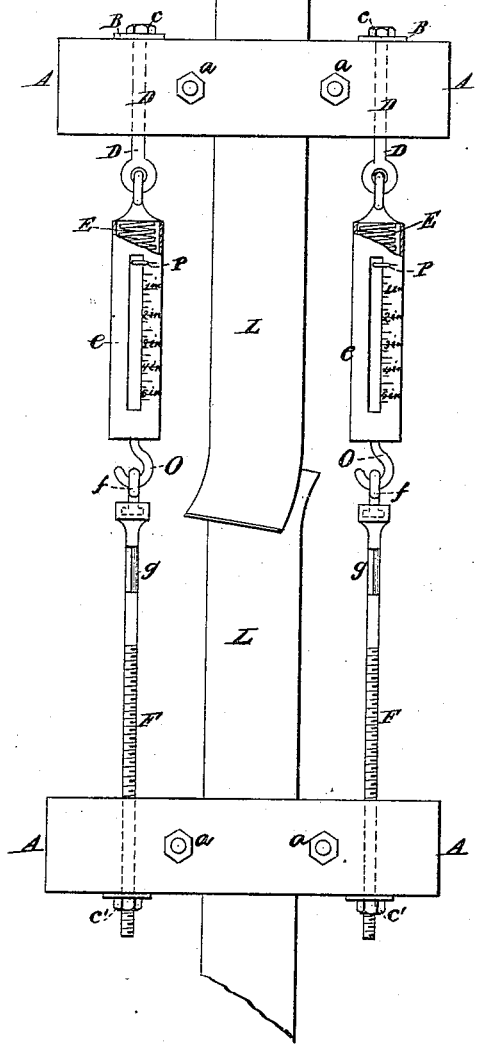
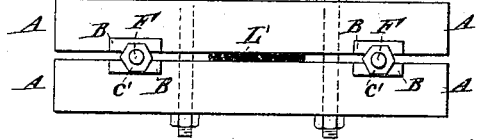
Witnesses:
Charles R. Searle,
Mary A. Meghan
Lienau Walden,
Inventor:
By A. M. Pierce,
Attorney.
N. PETERS, Photo-Lithographer, Washington, D. C.

UNITED STATES PATENT OFFICE.

LIENAU WALDEN, OF SPRING HILL, PENNSYLVANIA.

GRADUATED BELT-STRETCHER.

SPECIFICATION forming part of Letters Patent No. 241,099, dated May 3, 1881.

Application filed March 21, 1881. (No model.)

*To all whom it may concern:*

Be it known that I, LIENAU WALDEN, of Spring Hill, in the county of Delaware and State of Pennsylvania, have invented certain new and useful Improvements in Graduated Belt-Stretchers, of which the following is a full, clear, and exact description, reference being had to the accompanying drawings, and to the letters of reference marked thereon.

My invention relates especially to that class of devices employed in large or small machine-shops, or wherever driving-belts for machinery are used; and it consists in a mechanical contrivance for holding the belt firmly while it is being stretched to the required degree of tension, securing the same in such manner that the ends of the belt may be laced or fastened together in any approved manner; and also in the means employed for showing exactly what degree of tension should be given for belts of various widths. And my invention involves certain novel and useful combinations or arrangements of parts and peculiarities of construction and operation, all of which will be hereinafter first fully described, and then pointed out in the claims.

In the drawings, Figure 1 is a plan view of my graduated belt-stretcher, showing the arrangement of all the parts, the ends of a belt being placed therein ready to be stretched to the proper tension; and Fig. 2 is a side elevation of two of the blocks used for holding the belt.

Like letters of reference, wherever they occur, indicate corresponding parts in both the figures.

Heretofore, in the use of belts for driving machinery of all kinds, considerable experience and skill have been necessary on the part of the mechanic or operator in order to enable him to determine the necessary tension to give a belt when adjusting it to the driving-pulleys. The usual mode is for the workman to adjust the ends of the belt after it has been passed over the pulleys, and by pressing upon or striking the belt with his open hand to determine the tension. No matter what may be the experience of the operator, he is liable to make mistakes, cutting off too much of the belt, thereby rendering it unfit for use in the position intended, or by leaving it too loose he is compelled to readjust it, thereby necessitating further loss of time and stoppage of the machinery. By use of my improved device no peculiar skill is necessary, an apprentice being as capable of ascertaining and giving a belt the requisite degree of tension as a mechanic of experience.

It often occurs, from the shape or location of pulleys, that the belt must be placed thereon before it can be laced. By the old method of adjustment this is an awkward and tedious process; but where my device is used the ends of the belt may be as easily and quickly fastened together while the belt is on the pulleys, and stretched as tightly, as when the same is simply passed over the driving-shaft.

A A are blocks of hard wood or metal, as preferred, the same being made of sufficient length and strength to hold all ordinary sizes of belting. Where extra large sizes are used the blocks may be made to conform with the work to be done.

B B are metal plates secured to the wooden blocks by screws, or in any preferred manner. These plates are slotted so that the bolt-head $c$ may be secured therein.

$a\ a$ are bolts extending through the blocks, as shown by the dotted lines in Fig. 2. Four of these blocks are employed, two upon each end of the belt.

D D are bolts passing through grooves upon the inner face of each block, their position being indicated by the dotted lines in Fig. 1. Upon the end of the bolt D, opposite to the head $c$, an eye is provided for the reception of a ring attached to the graduated spring E.

F F are bolts passing through grooves in the other series of blocks. These bolts are much longer than D D, and are screw-threaded for at least one-half of their length. The rings $f\ f$, upon the ends of each bolt opposite to nuts $c'\ c'$, are swiveled, so that the bolt may be turned freely either to the right or left without turning the ring $f$. At $g\ g$ the bolts F are made square, for the purpose of applying a wrench when it is desired to turn them in either direction.

E E are steel springs, constructed after the well-known method employed for common weighing-scales. Of course the springs used therein must be of greater strength. Instead of marking the number of pounds upon the spring-case $e$, the different widths of belting usually employed may be stamped, painted, or otherwise placed thereon, running from one inch up to any number in width, and the space between the numbers may be divided into halves and quarters when a great degree of accuracy is required.

I have found by careful experiment that the safe working strain to place upon a belt one inch in width is 66.25 pounds. The tension to which the belt should be drawn is 42.5 pounds. From this it will be seen that the point marked one inch upon the spring-cases represents 21.25 pounds, the strain being equally divided between the two springs; for a two-inch belt 42.5 pounds, &c.

P is a marker, attached to the spring and projecting through a slot in case e, for the purpose of showing when the spring has been stretched the required distance.

O O are hook-shanks, attached to the spring at its free end for the purpose of connecting with rings f f.

L L are the two ends of a belt, secured in place in blocks A ready for adjustment.

L' is a section of the belt, showing its position between the blocks. Where metal blocks are employed instead of wood that part which comes in contact with the belt may be slightly corrugated or roughened to prevent slipping.

When the various parts of my graduated belt-stretcher are assembled for use the mode of operation is as follows: The nuts upon bolts a a being loosened, the ends of a belt placed in position on the pulleys upon which it is to be used are passed between the blocks, and the bolts are tightly screwed up, forcing the blocks securely down upon the belt. The swivel-ring being hooked to the springs, a wrench is applied to the square shoulders g upon bolts F alternately, and the screw-thread thereon is turned through the nuts c' until the marker P indicates upon each spring-case that the proper degree of tension for the size of belt used has been reached. The ends of the belt are now laced, riveted, or otherwise united, and bolts F are loosened until the strain is removed from both of the springs, and they return to their normal position. The nuts on bolts a are now removed, the blocks taken apart, and the device released from the belt.

It will be seen that by use of my graduated belt-stretcher no mistakes can be made in adjusting the belt, and the whole operation is easily and quickly accomplished, the device admirably answering the various uses and purposes for which it is intended.

Having now fully described my invention, what I claim as new therein, and desire to secure by Letters Patent, is—

1. In a belt-stretching apparatus of the character herein specified, the combination, with the griping-blocks for holding the ends of the belt, of the graduated springs secured to said blocks and indicating the proper degree of tension when reached, substantially as shown and described.

2. In a belt-stretching apparatus, the combination, with the graduated springs and griping-blocks, of the screw-threaded bolts F F for tightening the belt, the same being held firmly in position while being laced, substantially as shown and described.

3. In a graduated belt-stretcher, the blocks A, plates B, nuts c, bolts a, bolts D, springs E, shanks O, cases e, indicator P, swivel-rings f, bolts F, and nuts c', the whole being combined and arranged to operate substantially as and for the uses and purposes shown and described.

In testimony that I claim the foregoing I have hereunto set my hand in the presence of two witnesses.

LIENAU WALDEN.

Witnesses.
EDWD. WALDEN,
WESTON DONALDSON.